(12) United States Patent
Wilson

(10) Patent No.: US 8,627,775 B1
(45) Date of Patent: Jan. 14, 2014

(54) BURNING APPARATUS FOR A SOLID WOOD-FUELED PROCESS HEATING SYSTEM

(76) Inventor: David L. Wilson, Isabella, MI (US)

( * ) Notice: Subject to any disclaimer, the term of this patent is extended or adjusted under 35 U.S.C. 154(b) by 963 days.

(21) Appl. No.: 12/660,649

(22) Filed: Mar. 2, 2010

(51) Int. Cl.
*F23L 15/00* (2006.01)
*F23G 5/027* (2006.01)
*F23M 7/00* (2006.01)
*F23N 3/00* (2006.01)
*F23B 10/00* (2011.01)

(52) U.S. Cl.
USPC ........ 110/303; 110/173 R; 110/147; 110/308; 110/348; 110/254; 110/214

(58) Field of Classification Search
USPC ............. 110/229, 230, 303, 304, 173 R, 147, 110/308, 348, 254, 214
See application file for complete search history.

(56) References Cited

U.S. PATENT DOCUMENTS

| | | | | |
|---|---|---|---|---|
| 2,151,642 A | * | 3/1939 | Rose | 110/147 |
| 3,623,458 A | * | 11/1971 | Block | 122/18.4 |
| 3,702,594 A | * | 11/1972 | Howes | 110/187 |
| 3,785,306 A | * | 1/1974 | Jaget et al. | 110/226 |
| 4,113,469 A | | 9/1978 | Grenfell et al. | |
| 4,601,657 A | * | 7/1986 | Henin et al. | 110/229 |
| 5,284,550 A | | 2/1994 | Tanca et al. | |
| 5,304,780 A | * | 4/1994 | Blankenship | 110/250 |
| 5,408,942 A | | 4/1995 | Young | |
| 5,566,625 A | | 10/1996 | Young | |
| 5,660,542 A | | 8/1997 | Rinker et al. | |
| 5,727,482 A | | 3/1998 | Young | |
| 5,738,509 A | | 4/1998 | Marling et al. | |
| 6,164,058 A | | 12/2000 | Dobbeling et al. | |

* cited by examiner

*Primary Examiner* — Kenneth Rinehart
*Assistant Examiner* — David J Laux

(57) ABSTRACT

A burner apparatus (10) for a process heating system (400) includes a combustion air damper (48) to control the volume of air in the combustion chamber (98). Top (15), bottom (17), and sidewalls (14) of the chamber are of steel without refractory material lining while a fuel door (178) is steel with refractory material lining (186). A flue gas damper (34) selectively allows or disallows flue gas out of the chamber. A cooling jacket (18) of a steel sheeting surrounds and is narrowly spaced from the combustion chamber top, bottom, and sidewalls. The cooling jacket conducts air, transfers heat from the combustion chamber top, bottom, and sidewalls to thereby prevent overheating, and generates heated air. A turbulation device (38) combines flue gas and heated air into a turbulent air-gas mixture, completes combustion, and outputs a heated gas stream.

14 Claims, 5 Drawing Sheets

BURNING APPARATUS FOR A SOLID WOOD-FUELED PROCESS HEATING SYSTEM

FIELD OF THE INVENTION

The invention herein disclosed and claimed relates to a wood-fueled process heating system useful as a heat source for drying biomass products and, more particularly, to a burner apparatus for such a process heating system.

BACKGROUND OF THE INVENTION

The apparatus to be disclosed involves a novel, useful, and non-obvious burner apparatus for a process heating system, a novel, useful, and non-obvious process heating system based on this burner apparatus, and a novel, useful, and non-obvious method to provide a process heat stream for a heat-consuming process based on this technology.

Biomass fired process heaters have been used for several decades to improve the economies of industrial drying processes, particularly for drying of biomass products. Biomass fired process heaters have allowed expensive fossil-fuels, such as natural gas, liquefied petroleum gas, and fuel oil, to be replaced with biomass fuels that are often available as a byproduct—or even as a direct product—of the industrial process. Several previous inventions have been used to that end.

The most popular biomass-based process heating system in current use is based on a cyclonic suspension burner. A cyclonic suspension burner uses biomass that has been ground to a powder. Often this biomass is obtainable directly from the product stream at a point downstream from the drying process. The ground biomass is injected into a refractory-lined vertical cylinder in which a suspended vortex is created by injecting ambient air tangentially into a cylindrical combustion chamber. The ground biomass and air mixture are suspended in the vortex. A source of ignition, such as a fossil fuel burner, is provided to initiate the combustion process, which after a short time becomes self-sustaining. Hot combustion products and unconsumed secondary air are sent to a drying system, such as a rotary drum dryer, as the process heat source. This process heat source is used in the rotary drum dryer to dry wet biomass feedstock. As the biomass feedstock is dried, a part of the final product is removed, grinded, and sent back upstream to the cyclonic suspension burner as the ground biomass fuel source. A largely self-sustaining process is thereby created.

Several disadvantages have been found with process heating systems based on cyclonic suspension burner technology. First, the cyclonic suspension burner generates very high temperatures in the combustion chamber. To prevent damage to combustion chamber components, the chamber must be lined with large quantities of refractory materials. Typically, several tons of refractory materials must be installed into the large burner. The use of these refractory materials increases the cost of the burner and creates significant maintenance issues. Refractory materials tend to have poor mechanical properties, such as brittleness. It is not feasible to install the refractory material at the factory where the burner is manufactured because the refractory material would be damaged during shipping. Therefore, the refractory material installation must be performed at the biomass drying plant. The cost to install these refractory materials makes a low output process heating system—one with less than 10 Mega BTU per hour—economically unfeasible. Further, the refractory materials tend to deteriorate under thermal and physical loading after relative short periods of operation. Typically, after several hundred hours, the refractory materials must either be replaced or substantially repaired. Replacement or repair of the refractory materials requires a complete shutdown of the suspension burner for considerable time, such as several days, before the system can be restarted. Refractory material replacement, repair, and maintenance are expensive due to system downtime and the need for skilled labor.

Second, in a typical biomass process, the wet biomass feedstock must be cleaned prior to drying. During this cleaning process, some of the biomass is removed. This removed biomass cannot be used as end product. Further, the removed biomass cannot be used as fuel for the cyclonic suspension burner since it is not dried and not ground. And, in some cases, the removed biomass would not be suitable for use in the suspension burner even if it was cleaned and dried. Therefore, the removed biomass must simply be disposed to avoid accumulation of unused material at the process site. This removed biomass therefore creates both a disposal cost and lost energy cost that effects the efficiency of the overall production process. Third, cyclonic suspension burner systems tend accumulate significant volumes of ash within the combustion chamber. This ash must be periodically removed to keep the burner operational. To remove the ash, the burner must be completely shut down. Starting, stopping, and re-starting the cyclonic suspension burner consumes considerable time and fossil fuel. Finally, the dried and ground biomass fuel for the suspension burner comes directly from the end products of the process. While this features creates a generally self-sustaining production line, the cyclonic suspension heating system often consumes up to about 20% of the biomass end product.

Other prior art technologies for biomass fueled process heating suffer similar problems as those described above. Typical process heating system heat sources require sorting and cleaning of the biomass fuel to remove less than pristine components, such as tree bark. Systems able to burn less than pure biomass typically required large amount of expensive refractory materials in the combustion chamber. Other systems are mechanically complex and, therefore, prohibitively expensive for small operations that produce less than 10 ton/hour.

There is, therefore, a significant unmet need in the art for a heating source for a process heating system which can use minimally processed solid wood wastes, such as slab-wood, cord wood, or pallet wood, as a fuel source while creating large volume, process heat streams that can be used in rotary industrial dryers to dry biomass products. A system such as this would increase drying process flexibility while reducing operating costs. Further, there is a significant unmet demand for an economical biomass-fired process heating system for small operations where the manufacturing and maintenance costs associated with the use of refractory materials are minimized or avoided altogether.

BRIEF DESCRIPTION OF THE DRAWINGS

The present invention and the corresponding advantages and features provided thereby will be best understood and appreciated upon review of the following detailed description of the invention, taken in conjunction with the following drawings, where like numerals represent like elements, in which.

DETAILED DESCRIPTION OF THE INVENTION

Figure 1:
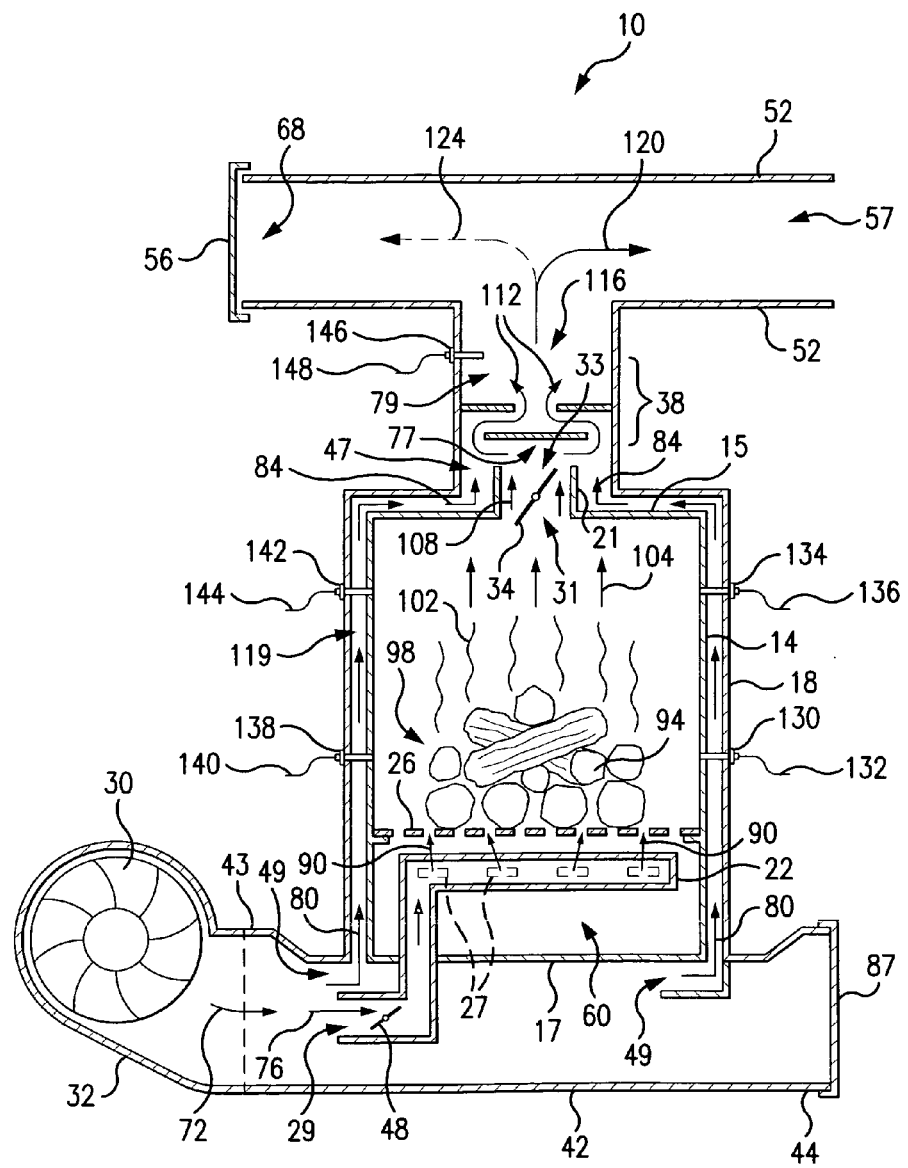
FIG. 1 is a cross-sectional view of an exemplary burner apparatus for generating a heated gas stream for a process heating system in accordance with an embodiment of the invention.

The present invention provides a burner apparatus for generating a heated gas stream for a process heating system. In one embodiment, the burner apparatus includes a combustion air damper, a combustion chamber, a flue gas damper, a cooling jacket, and a turbulation device. The combustion air damper includes an inlet and a plurality of outlets. The inlet is coupled to an air supply, and the combustion air damper is operable to adjustably control the volume of air exiting the plurality of outlets. The combustion chamber includes a top, a bottom, a plurality of sidewalls, a fuel grate, a flue, and a fuel door. The fuel grate is suspended above the plurality of combustion air damper outlets. The top, bottom, and plurality of sidewalls are steel without refractory material lining, and the fuel door is steel with refractory material lining.

The flue gas damper includes an inlet and an outlet. The flue gas damper is operable to selectively allow or disallow flue gas to exit through the combustion chamber flue. The cooling jacket includes an inlet and an outlet. The cooling jacket is a steel sheeting surrounding and narrowly spaced from the combustion chamber top, bottom, and plurality of sidewalls. The inlet is coupled to an air supply. The cooling jacket is operable to conduct air from inlet to outlet and to transfer heat from the combustion chamber top, bottom, and plurality of sidewalls and into the air to thereby prevent the combustion chamber top, bottom, and plurality of sidewalls from overheating, and to generate heated air at the outlet. The turbulation device includes an inlet and an outlet. The inlet is coupled to the flue gas damper outlet and to the cooling jacket outlet. The turbulation device is operable to combine flue gas and heated air into a turbulent air-gas mixture, to complete combustion of the turbulent air-gas mixture, and to output a heated gas stream though the outlet.

In another embodiment, a process heating system is provided. The process heating system includes a burner apparatus for generating a heated gas stream, an ambient air mixing valve, a heat-consuming process, and an induction fan. The burner apparatus includes a blower, an air supply manifold, a combustion air damper, a combustion chamber, a flue gas damper, a cooling jacket, a turbulation device, and a gas collection manifold. The air supply manifold includes an inlet and a plurality of outlets. The inlet is coupled to the blower. The air supply manifold is operable to supply air to at least one additional burner apparatus. The combustion air damper includes an inlet and a plurality of outlets. The inlet is coupled to at least one air supply manifold outlet. The combustion air damper is operable to adjustably control the volume of air exiting the plurality of outlets. The combustion chamber includes a top, a bottom, a plurality of sidewalls, a fuel grate, a flue, and a fuel door. The fuel grate is suspended above the plurality of combustion air damper outlets. The top, bottom, and plurality of sidewalls are steel without refractory material lining, and the fuel door is steel with refractory material lining.

The flue gas damper includes an inlet and an outlet. The flue gas damper is operable to selectively allow or disallow flue gas to exit through the combustion chamber flue. The cooling jacket includes an inlet and an outlet. The cooling jacket is a steel sheeting surrounding and narrowly spaced from the combustion chamber top, bottom, and plurality of sidewalls. The inlet is coupled to at least one air supply manifold outlet. The cooling jacket is operable to conduct air from inlet to outlet and to transfer heat from the combustion chamber top, bottom, and plurality of sidewalls and into the air to thereby prevent the combustion chamber top, bottom, and plurality of sidewalls from overheating and to generate heated air at the outlet.

The turbulation device includes an inlet and an outlet. The inlet is coupled to the flue gas damper outlet and to the cooling jacket outlet. The turbulation device is operable to combine flue gas and heated air into a turbulent air-gas mixture, to complete combustion of the turbulent air-gas mixture, and to output a heated gas stream though the outlet. The gas collection manifold includes an inlet, a passive outlet, and an active outlet. The inlet is coupled to the turbulation device outlet. The active outlet is operable to conduct, under negative pressure, the heated gas stream. The passive outlet is operable to allow the heated gas stream to vent to the atmosphere when the active outlet does not have negative pressure. The gas collection manifold is operable to collect the heated gas stream from at least one additional burner apparatus.

The ambient air mixing valve includes a first inlet, a second inlet, and an outlet. The first inlet is coupled to the active outlet of the gas collection manifold, and the second inlet is coupled to an ambient air source. The ambient air mixing valve is operable to adjust the ratio of the volume of the heated gas stream to the volume of ambient air output at the outlet as a process heat stream. The heat-consuming process includes an inlet duct coupled to the ambient air mixing valve outlet and operable to receive the process heat stream. The induction fan includes an inlet coupled to the heat-consuming process outlet. The induction fan is capable of drawing the process heat stream through the heat-consuming process.

In another embodiment, a method to provide a process heat stream for a heat-consuming process is achieved. The method includes burning fuel in a combustion chamber to generate flue gas, forcing air through a cooling jacket surrounding and narrowly spaced from the combustion chamber to generate heated air, mixing the flue gas and the heated air to generate a heated gas stream, mixing the heated gas stream and an ambient air source to generate a process heat stream, and providing the process heat stream to the heat consuming process.

The apparatus, system, and method of the present invention yield several novel and unexpected advantages over the prior art. A novel and non-obvious burner apparatus for generating a heated gas stream for a process heating system is realized. The apparatus can use minimally processed solid wood wastes, such as slab-wood, cord wood, or pallet wood, as a fuel source while creating large volume process heat streams that can be used in rotary industrial dryers to dry products. This system increases drying process flexibility while reducing operating costs. Further, the burner apparatus uses very little refractory material. The refractory material is used in only on the fuel door and can be easily replaced without expensive, on-site maintenance and without disrupting the drying process. Further, the burner apparatus is relative simple in construction. The burner apparatus is economical for small operations. A novel and non-obvious process heating system is realized which incorporates the advantages of the burner apparatus. A novel and non-obvious method to generate a heated gas stream is thereby realized. The present invention is scalable, transportable, durable, and affordable. Other advantages will be recognized by those of ordinary skill in the art.

Figure 2:
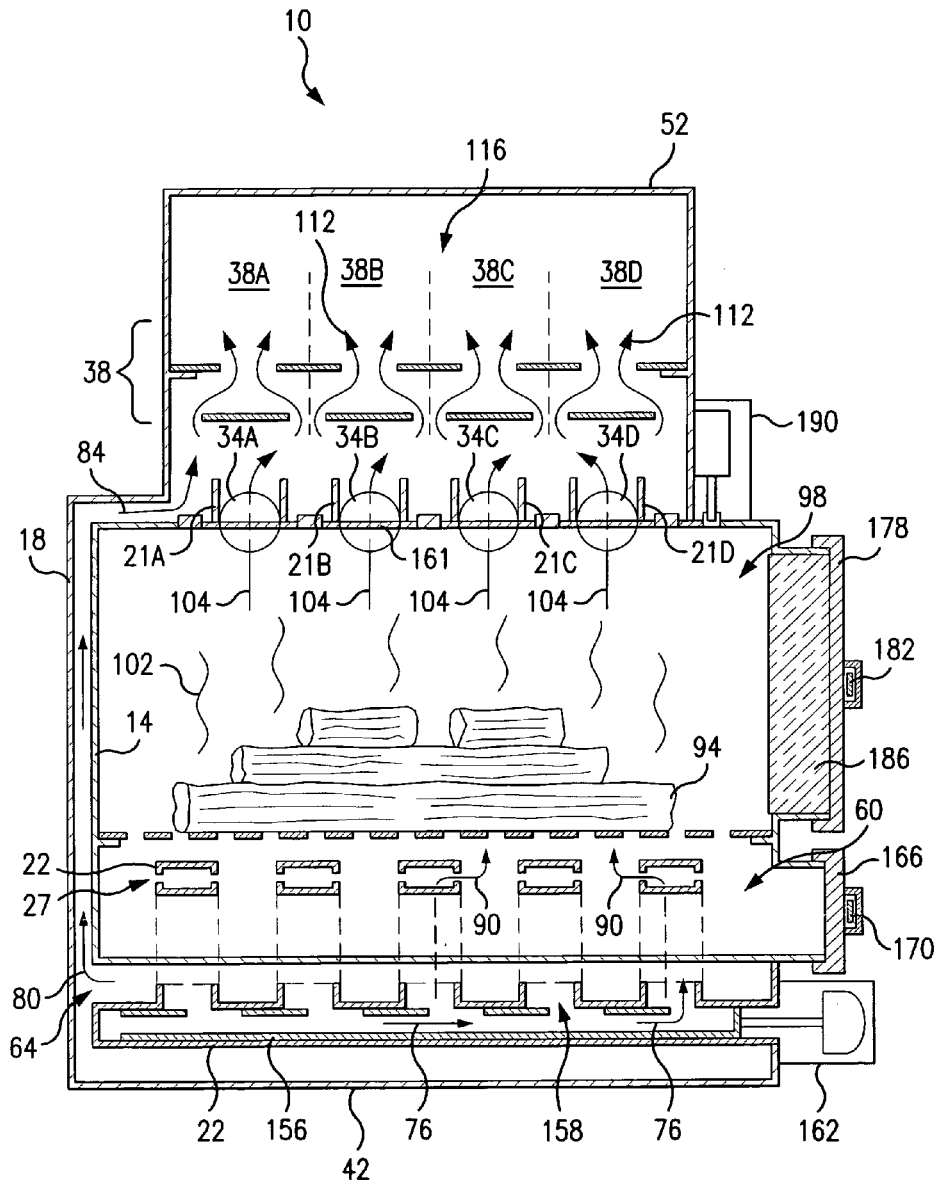
FIG. 2 is an alternative cross-sectional view of the exemplary burner apparatus for generating a heated gas stream for a process heating system in accordance with an embodiment of the invention.

Referring now to FIG. 1, an exemplary burner apparatus for generating a heated gas stream for a process heating system in accordance with an embodiment of the invention is shown in cross sectional view. Referring to FIG. 2, an alternative cross section of the same exemplary burner apparatus is shown. Referring again to FIG. 1, the burner apparatus 10 includes a combustion air damper 48, a combustion chamber 98, a flue gas damper 34, a cooling jacket 18, and a turbulation device 38. The combustion air damper 48 includes an inlet 29 and a plurality of outlets 27. The inlet 29 is coupled to an air supply 72 and, more preferably, to a blower 30. The combustion air damper 48 controls the volume of intake air 76 that is allowed to traverse a combustion air manifold 22 and exit the plurality of outlets 27 as outlet air 90. This outlet air 90 is then available for combustion in the combustion chamber 98. Preferably, the combustion air manifold 22 includes several outlets 27 arrayed across the combustion chamber 98. Preferably, the combustion air manifold 22 is made from steel, and more preferably, from square steel tubing. The combustion air damper 48 is shown schematically as rotating valve, but is preferably implemented as a sliding valve as illustrated in FIG. 2 and further described below.

Referring again to FIG. 1, the combustion chamber 98 includes a top 15, a bottom 17, a plurality of sidewalls 14, a fuel grate 26, a flue 21, and a fuel door, shown on FIG. 2. Referring again to FIG. 1, the fuel grate 26 is suspended above the plurality of combustion air damper outlets 27. The fuel grate 26 preferably comprises a steel grating sufficiently robust to hold many hundreds of pounds of wood-based fuel stock 9 Leon Wozniak [nustar.saginaw@att.net]4. The fuel grate 26 includes openings of sufficient size to allow ash to fall into the ash collection area 60 and to allow the combustion air 90 to flow from the combustion air damper outlet 27 and into the fuel stock 94.

Preferably, the top 15, bottom 17, and sidewalls 14 of the combustion chamber 98 are steel. More importantly, the top 15, bottom 17, and sidewalls 14 of the combustion chamber 98 bear no refractory material lining. This is a significant change from prior art heating sources where the inner surfaces of the combustion chamber are lined with refractory material for protection from the intense heat generated in the burning process. More preferably, the top 15, bottom 17, and sidewalls 14 of the combustion chamber 98 are bare metal. As further illustrated and described herein, the novel and non-obvious combination of features of the present invention allow the combustion chamber 98 to be constructed without refractory material protection yet without jeopardizing performance or reliability. As a result, an effective and economical burning apparatus is created. Only the fuel door, shown in FIG. 2 and further described below, are lined with refractory material.

Referring against to FIG. 1, the flue gas damper 34 includes an inlet 31 and an outlet 33. The flue 21 is positioned in the top 15 of the combustion chamber 98. As the fuel stock 94 is burned, it gives off heat 102 and produces flue gas 104. The flue gas 104 is a combination of typical combustion by-products, such as carbon dioxide and carbon monoxide, combined with small amounts of volatile organic compounds (VOC). The flue gas 104 is very hot, typically more than about 1500 degrees F. The flue gas damper 34 is operable to selectively allow or disallow flue gas 104 entering the damper inlet 31 to exit the damper outlet 33 and the combustion chamber 98 as outlet flue gas 108. The flue gas damper 34 is shown in the FIG. 1 cross sectional view as a single rotating valve. In the alternative cross section of FIG. 2, the preferred embodiment is shown as a series of rotating valves spread across the top of the chamber. The flue gas damper 34 is further described below.

Referring again to FIG. 1, as an important feature, the cooling jacket 18 surrounds and is narrowly spaced from the top 15, bottom 17, and plurality of sidewalls 14. The cooling jacket 18 includes an inlet 49 and an outlet 47. The cooling jacket 18 preferably is steel sheeting. The cooling jacket inlet 49 is coupled to an air supply 72 and, more preferably, the same blower 30 that is used to source air to the combustion chamber air damper 48. The cooling jacket 18 is operable to conduct inlet air 80 from inlet 49 to the outlet 47 where it is output as heated air 84. As the air is conducted in the cooling jacket 18, heat is transferred from the top 15, bottom 17, and sidewalls 14 of the combustion chamber 98. As a result, the cooling jacket air removes heat from the combustion chamber top 15, bottom 17, and sidewalls 14 and prevents them from overheating. This heat transfer generates heated air 84 output at the cooling jacket outlet 47. For example, the heated air 84 from the heating jacket 18 is found to be about 400 degrees F. while the exiting flue gas 108 is greater than about 1500 degrees F. It is also found that the cooling jacket 18 prevents the combustion chamber sidewalls 14 exceeding about 400 degrees under steady state conditions. As a result, the sidewalls 14 are not exposed to excessive temperatures that would cause warping and earlier failure. The use of the cooling jacket 18 eliminates the need to line the sidewalls with expensive and difficult to maintain refractory material.

Management of thermal stress is a major consideration in the invention. The burner apparatus 10 is designed to allow for significant differential expansion between the top 15, bottom 17, and sidewalls 14 of the combustion chamber and the cooling jacket 18. Yet, the design prevents any significant amount of leakage of the heated air 84 from the cooling jacket 14 due to expansion of metal. To achieve this, heavy vertical structural-integrity support beams, not shown, run outside the top, bottom, and sidewalls of the combustion chamber to prevent warping of the combustion chamber. The cooling jacket 18 is then held in place against the support beams, but is not welded directly to the beams. Spaces between these support beams form a duct 119 between the cooling jacket 18 and top 15, bottom 17, and sidewalls 14 for airflow.

The turbulation device 38 includes an inlet 77 and an outlet 79. The inlet 77 is coupled to the flue gas damper outlet 33 and to the cooling jacket outlet 47. The turbulation device collects the flue gas 108 released through the flue gas damper 34 and the heated air 84 outlet from the top of the cooling jacket 18. The turbulation device 38 combines this flue gas 108 and the heated air 84 into a turbulent air-gas mixture 112. As a result, any combustible components remaining in the flue gas 108 are completely combusted in the turbulent air-gas mixture in area 116 above the turbulation device 38. In addition, the combined turbulent air-gas mixture forms a heated gas stream 120. The turbulation device 38 creates a homogenous hot gas stream 120 that is emptied into a gas collection manifold 52. Further details and operation of turbulation device 38 are shown in detail in FIGS. 3-5 and further described below.

Referring again to FIG. 1, a solid wood fuel 94 preferably is placed onto the steel fuel grate 26 inside of the steel combustion chamber 98. This fuel stock 94 is ignited with the assistance of a small quantity of kindling and tinder, not shown. The combustion chamber 98 is then sealed by closing the fuel door, shown in FIG. 2. Referring again to FIG. 1, combustion air 90 is fed into the combustion chamber 98 from under the fuel grate 26. The flue gas 108 from combustion is allowed to exit the combustion chamber 98 through several adjustable flue gas dampers 34 at the top 15 of the combustion chamber 98. The burner apparatus 10 burns solid wood fuel 94 that is sized on the order of the dimensions of split cord wood or halved slab wood. Wood fuel with moisture content as high as 35% can be effectively utilized in this heating system. This direct-fired process heating system is designed to produce a heated air stream 120 with a temperature of up to 750 degrees F. at atmospheric pressure and at volumetric flow rates of about 6,000 CFM per burner subunit. A single burner apparatus thermal output is about 2 Mega BTU/hour.

Heat 102 from the flames and hot coals is transmitted to the bare steel walls 14 of the combustion chamber 98 primarily through thermal radiation. It is found that at least half of the energy produced by the burning wood 94 escapes the combustion chamber as heated flue gases 108—including combustion by-products and unconsumed secondary air. The rest of the energy heats the combustion chamber sidewalls 14. Without a refractory material lining, the steel sidewalls 14 would be expected to overheat, warp, and rapidly fail. However, in the invention, the steel sidewalls 14 are kept far below the temperature of the burning fuel pile 94 by the use of high-velocity cooling air 80 passing along the sidewalls 14 of the combustion chamber 98—from bottom to top.

The heated air 84 exits the cooling jacket 18 within about an inch of the location 31 where the combustion chamber flue gas 108 exits combustion chamber 98. The turbulation device 38 mixes the very hot flue gas 108 and the heated air 84 via mechanical-passive mixing. These gases 108 and 84 are mixed in such a way as to produce a thermally homogeneous gas stream 120 above the each flue 21. This homogenization is accomplished within the space of about 7 vertical inches above the flue 21.

Referring again to FIG. 1, the burner apparatus 10 is supplied with air 72 for combustion and for cooling. The supply air 72 is carried in an air supply manifold 42. The supply air is preferably supplied from an industrial centrifugal blower 30. The blower 30 is coupled to the inlet 43 of the air manifold 42 via the blower cowling 32. The air supply manifold 42 has several outlets. First, the air supply manifold 42 is coupled to the inlet 29 of the combustion air damper 48. Second, the air supply manifold 42 is coupled to the inlet 49 of the cooling jacket 18. Finally, the air supply manifold end 44 is coupled to a next heating apparatus (subunit) if used. If no second heating apparatus is used, then the air supply manifold 42 is capped 87 at the end 44.

The supply air 72 generated from a single blower 30 may be further used to supply several heating apparatus 10, or subunits. The end 44 of the air supply manifold is coupled to the air supply manifold inlet 43 of the next burner apparatus in a daisy-chain configuration as shown, for example, in the process heating system 400 in FIG. 7. Referring again to FIG. 1, the blower 30 is preferably capable of supplying about 2,500 CFM of air for the burner apparatus 10 at a pressure of about 14 inches of water column. If additional burner apparatus are used, then the blower is preferably capable of supplying about 2,500 CFM of air for each burner apparatus 10 at a pressure of about 14 inches of water column. Supply air for the industrial blower 30 is preferably sourced from outside of a self-contained process heater system via supply ductwork which is terminated with a corrugated, perforated metal screen that prevents foreign material of any significant size from entering the blower.

Similarly, a gas collection manifold 52 is included at the top the burner apparatus 10 to collect and transport the heated gas stream 120. The inlet 116 to the gas collection manifold 52 is connected to the outlet 79 of the turbulation device 38. The gas collection manifold 52 has two outlets, an active outlet 57 and a passive outlet 68. The active outlet 57 is connected to the heat-consuming process, such as a biomass drying process, not shown. The passive outlet 68 is preferably covered with an expanded metal cap 56. The apparatus is designed for use with a heat-consuming process that draws the heated gas stream 120 from gas collection manifold active outlet 57 via negative pressure. If the heat-consuming process does not draw the heated gas stream 120, or if it actively blocks the heated gas stream, then the rejected heated gas stream 124 will flow back towards the passive outlet 68. The expanded metal cap 56 will then allow the rejected heated gas stream 124 to vent to the atmosphere. This passive outlet assures that the rejected heated gas stream 124 has a means of escape and that the pressure in the gas collection manifold 52 never meaningfully exceeds atmospheric pressure. If the burner apparatus 10 is not the first burner in a process heating system using several burners (subunits), then the passive outlet 56 is connected to the outlet 57 of another gas collection manifold 52.

As can be seen, the burner apparatus 10 is modular to allow easy scaling of the system thermal output capability without redesign of the apparatus. This modularity is manifest in several features. First, the gas collection manifold 52 at the top of each burner 10 runs the full width of the burner so that multiple burners can be daisy-chained side-by-side to form a single output collection manifold running the length of the entire subunit chain. Second, air for the combustion chambers and cooling jackets for each burner is sourced from a pressurized air supply manifold 42 running under each burner. A single supply fan 30 can be coupled onto multiple burners that are daisy-chained together.

The burner apparatus 10 includes several temperature sensors. For example, temperature sensors 130, 134, 138, and 142 are mounted in the sidewalls 14 of the combustion chamber 98 to allow the temperature of the sidewalls to be measured at several locations. By monitoring the signals 132, 136, 140, and 144, from each of the temperature sensors 130, 134, 138, and 142, respectively, a real-time temperature gradient of the sidewalls is derived. Similarly, one or more temperature sensors 146 are mounted above the turbulation device 38 and positioned to measure the temperature of the heated gas stream 120. Where the burner apparatus 10 includes several flue dampers 34, preferably, one temperature sensor 146 is placed over each flue damper 34 above its section of the turbulation device 38. The signals 148 of each temperature sensor 146 are recorded and averaged to obtain an aggregate output temperature for the heated gas stream 120.

Referring again to FIG. 2, the exemplary burner apparatus for generating a heated gas stream for a process heating system is shown in an alternative cross sectional view. In this view, the fuel door 178 and ash clean-out door 166 are visible. The fuel door 178 is lined with refractory material 186. Alternatively, the fuel door 178 may be lined with refractory material 186 and an insulating layer, not shown, disposed between the refractory material 186 and the fuel door 178. As described above, the bare steel sidewalls 14 of the combustion chamber 98 are protected from overheating by the high velocity air 80 flowing through the cooling jacket 18. However, this air does not flow through the door 178. Therefore, the door 178 must be protected by the refractory material 186. When the refractory material 186 on the door requires maintenance, however, the entire fuel door 178 or ash clean-out door 166 can simply and quickly be replaced with little or no down time. A new or refurbished door can simply be dropped into place.

The fuel door 178 and ash clean-out door 166 further include latches 182 and 170. In the preferred embodiment, the latches 182 and 170, and particularly the fuel door latch 182, are coupled to a computer-controlled lock-out mechanism, as is further described below. The fuel door 178 can be assembled at the factory with the refractory material 186 and then shipped to the biomass processing plant separately from the rest of the burner apparatus 10. The burner apparatus 10, sans doors 178 and 166, is fully road-transportable. Replacement doors can be prepared the same way. Since the doors are the only use of refractory material in the invention, the prior art issues of installation and repair of combustion chamber refractory materials at the biomass processing site are avoided. In addition, relatively little refractory material is required.

The alternative cross sectional view of FIG. 2 reveals additional details of a preferred embodiment of the combustion air damper. The preferred embodiment of the combustion air damper includes the combustion air manifold 22, a sliding valve sleeve 156, and a series of ports 158 in the manifold 22. Intake air 76 enters the combustion air manifold 22 from the air supply manifold 42 as shown in FIG. 1. Referring again to FIG. 2, the sliding valve sleeve 156 is connected to a combustion air electromechanical actuator 162. The combustion air electromechanical actuator 162 is preferably an electric motor linked to the slide valve sleeve 156 and controllable by a computer controller. As the sliding valve sleeve 156 is slid within the combustion air manifold 22, it alters the size of each port opening 158. As a result, the flow of intake air 76 is variably restricted as the port openings are adjusted between from fully opened to fully closed. Therefore, the volume of outlet air 90 from the combustion air damper is adjusted depending on the position of the sliding valve 156. When the ports 158 are completely closed, none of the intake air 76 is allowed to flow into the combustion chamber 98.

The alternative cross sectional view of FIG. 2 also reveals additional details of a preferred embodiment of the flue gas damper. The preferred embodiment flue gas damper includes several flues 21A, 21B, 21C, and 21D, each further including its own flue gas damper 34A, 34B, 34C, and 34D. The flue gas dampers 34A, 34B, 34C, and 34D are controlled by a single shaft 161 so that all the dampers rotate from opened to closed at the same time. The shaft 161 is preferably linked to a flue damper electromechanical actuator 190. The flue damper electromechanical actuator 190 is preferably an electric motor that is controllable by a computer controller. When the flue gas dampers 34A, 34B, 34C, and 34D are opened, the flue gas 104 is allowed to exit through the flues 21A, 21B, 21C, and 21D. When the flue gas dampers 34A, 34B, 34C, and 34D are closed, the flue gas 104 is not allowed to exit through the flues 21A, 21B, 21C, and 21D. When flue gas dampers are closed, none of the flue gas can escape the combustion chamber 98. To stop the combustion process, the combustion air damper and the flue gas dampers are closed.

The alternative cross sectional view of FIG. 2 also reveals additional details of the turbulation device 38. Preferably, the turbulation device 38 is constructed in a series of sections 38A, 38B, 38C, and 38D. Each section is aligned above one of the flues 21A, 21B, 21C, and 21D, respectively. Flue gas 104 and heated air 84 combine in each section 38A, 38B, 38C, and 38D of the turbulation device 38 to form combined turbulent air-gas mixtures 112 where any remaining combustible components in the flue gas are completely combusted. As a result, the heated gas stream 120 is clean enough to be released directly into the atmosphere. In addition, the heated gas stream 120 is homogenously mixed to a single temperature as it is emptied into the gas collection manifold 52. The turbulation device 38 is sized between one and six sections depending on the number of flues used in the burner apparatus 10.

Figure 3:
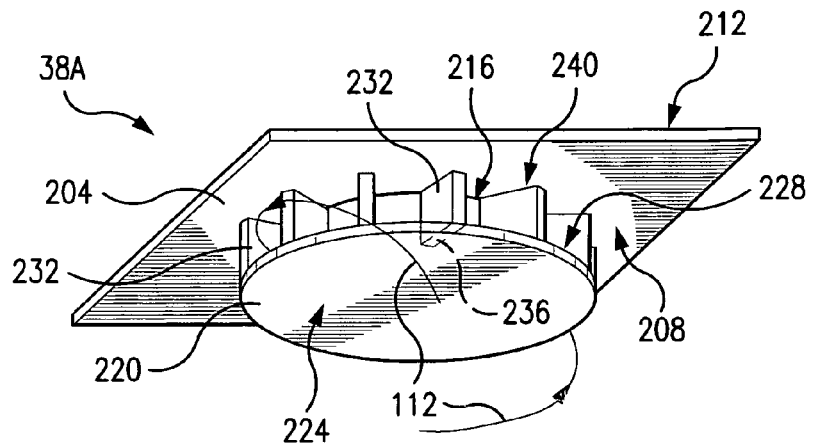
FIG. 3 is an isometric view of a single section of an exemplary turbulation device for the exemplary burner apparatus in accordance with an embodiment of the invention.
Figure 4:
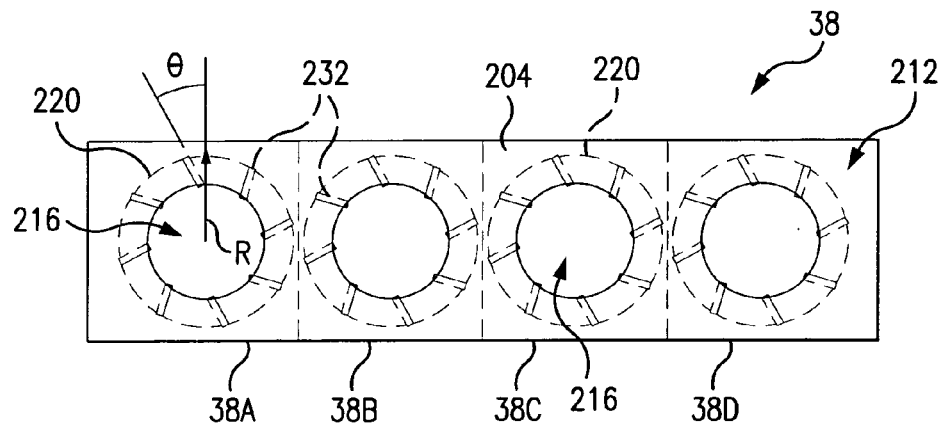
FIG. 4 is a top view of the exemplary turbulation device for the exemplary burner apparatus in accordance with an embodiment of the invention.
Figure 5:
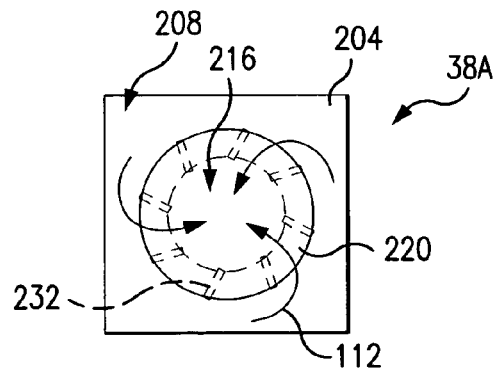
FIG. 5 is a bottom view of a single section of the exemplary turbulation device for the exemplary burner apparatus in accordance with an embodiment of the invention.

Referring now to FIGS. 3, 4, and 5, an exemplary turbulation device for the burner apparatus in accordance with an embodiment of the invention is shown. FIG. 3 shows an isometric view of a single section 38A of the turbulation device. FIG. 4 shows a top view of the turbulation device 38 with four sections as depicted in FIG. 2. FIG. 5 shows a bottom view of a single section 38A of the turbulation device. Referring particularly to FIG. 1, the turbulation device section 38A includes a first plate 204, a series of slats 232, and a second plate 220. The first plate 204 has a top side 212, a bottom side 208, and circular opening 216. The series of slats 232 each have bottom ends 236 and top ends 240. The top end 240 of each slat 232 is attached to the bottom side 208 of the first plate 204 along the perimeter of the first plate circular opening 216. The second plate 220 has a top side 228, a bottom side 236, and is of a circular shape. The bottom end 236 of each slat 232 is attached to the top side 228 of the second plate 220 along the perimeter of the second plate circular shape.

The section 38A of the turbulation device 38 is placed into the burner apparatus in the orientation shown. The rising flue gas and cooling jacket heated air is stopped from rising by the first plate 204 and the second plate 220. The gas and air are forced to enter through spaces between slats 232. The flue gas and heated air are guided to the first plate circular opening 216 and are outlet from the device 38A.

Referring again to FIG. 4, the entire turbulation device 38 is shown with sections 38A, 38B, 38C, and 38D. Here, the top view of the device 38 is shown so that the circular openings 216 for each section are shown as solid lines while the circularly shaped second plates 220 for each section are shown as dashed lines. Referring particularly to the section labeled 38A, an important feature respecting the orientation of the slats is shown. In particular, each slat 232 is arranged such that one edge is roughly aligned to the perimeter of the circular opening 216 in the first plate 204, while another edge is roughly aligned to the perimeter of the circularly shaped second plate 220. However, the slats 232 are arranged at an angle $\theta$ offset from the radius R of the first plate circular opening 216 and the circularly shaped second plate 220. As a result, as the combined flue gas and heated air exiting between the slats 232 is caused to swirl in a turbulent air-gas mixture 112 as shown in FIG. 3. Referring again to FIG. 5, the single section 38A is shown from bottom view such that the circular opening 216 for the section is shown as a dashed line while the circularly shaped second plate 220 for the section is shown as a solid line.

Figure 6:
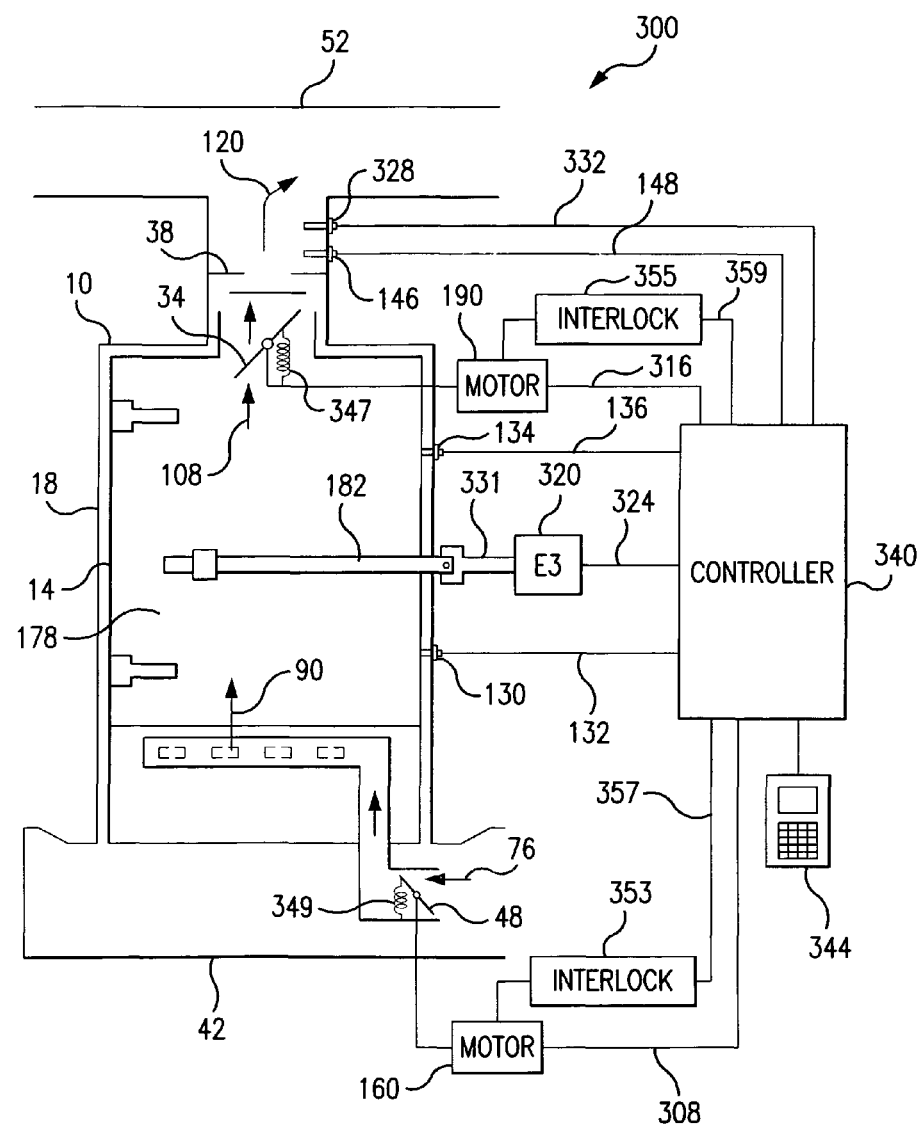
FIG. 6 is a schematic of an exemplary burner apparatus for generating a heated gas stream for a process heating system in accordance with an embodiment of the invention.

Referring now to FIG. 6, the exemplary burner apparatus 10 for generating a heated gas stream 120 for a process heating system in accordance with an embodiment of the invention is shown in schematic form. This schematic especially focuses on exemplary features for controlling the operation of the burner apparatus 10. A computer controller 340, which may be implemented as several controllers and which may use PID technology, is used to control the operation of the burner apparatus 10. Temperature sensors 130 and 134 are positioned to sense the temperature of the combustion chamber sidewalls 14 at several locations. Temperature sensors 146 and 328 are positioned to sense the temperature of the heated gas stream 120 above the turbulation device 38 as it enters the gas collection manifold 52. A combustion air damper electromechanical actuator 160 is mechanically attached to the combustion air damper 48. The combustion air damper electromechanical actuator 160 mechanically moves the combustion air damper 48 by, for example, moving a sliding valve as shown in FIG. 2, to adjust the position of the combustion air damper and thereby adjust the volume of intake air 76 that is released as combustion air 90. Referring again to FIG. 6, the combustion air damper electromechanical actuator 160 is preferably a servo motor responsive to a combustion air electrical signal 308 from the computer controller 340.

A flue gas damper electromechanical actuator 190 is mechanically attached to the flue gas damper 34. The flue gas damper electromechanical actuator 190 mechanically moves the flue gas damper 34 by, for example, rotating a valve as shown in FIG. 2, to open or close the flue gas damper 34 to thereby allow or disallow flue gas passage through the flue. Referring again to FIG. 6, the flue gas damper electromechanical actuator 190 is preferably a servo motor responsive to a flue gas electrical signal 316 from the computer controller 340. A fuel door electromechanical actuator 320 is mechanically attached to a lock 331 for the latch 182 of fuel door 178. The fuel door electromechanical actuator 320 mechanically locks and unlocks the latch 182 by, for example, inserting or de-inserting a locking pin. The fuel door electromechanical actuator 320 is preferably a solenoid responsive to a fuel door lock electrical signal 324 from the computer controller 340.

The computer controller 340 is capable of reading electrical signals 332, 148, 136, and 132 from the various temperature sensors 328, 146, 134, and 130, respectively. In turn, the computer controller 340 is capable of outputting electrical control signals, such as the combustion air signal 308, flue gas signal 316, and fuel door lock signal 324 based upon these temperature readings. In addition, the computer controller 340 is capable to control the electromechanical actuators 162, 190, and 320 based on operator inputs to an operator interface 344.

Operator safety is another major component of the invention's design. During normal operation, the combustion chamber of the burner apparatus 10 is filled with burning flue gas under a moderate pressure of about 1 inch water column due to the resistance imposed by the turbulation device 38. If the fuel door 178 to the combustion chamber were opened during combustion, hot burning flue gas could be expelled through the fuel door opening. In order to prevent this, several safety features have been incorporated into the burner apparatus 10 design.

First, the fuel door 178 is held closed during normal operation by a spring-loaded latch 182. The computer controller 340 commands the fuel door electromechanical actuator 320 to keep the latch 182 in the locked position as long as the computer controller 340 detects ongoing combustion. An operator attempting to open the fuel door 178 by moving the latch 182 is stopped by the lock 331. To open the fuel door 178 for refueling, the operator inputs a request to the computer controller 340 via the operator interface 344, such as by pressing a "door-open-request" button. The computer controller 340 then closes the combustion air damper 48 by sending command signal 308 to the combustion air damper electromechanical actuator 162. After the combustion air damper 48 is fully closed, the computer controller 340 closes the flue gas damper 34 by sending a command signal 316 to the flue gas damper electromechanical actuator 190. Closing the combustion air damper 48 starves the fire of oxygen, while closing the flue gas damper 34 prevents air from the cooling jacket 18, which enters outlets near the turbulation device 38 under pressure, from feeding back into the combustion chamber through the flue and acting as a supply of combustion air. Once both the combustion air damper 48 and the flue damper 34 are closed, the computer controller 340 unlocks the latch 182 by sending a command signal 324 to the fuel door electromechanical actuator 320. When the fuel door is then opened by the operator, any slight pressure in the combustion chamber is released once the door is about 5% of the fully open position. As the door is then opened completely, the only source of combustion air is through the fuel door opening, itself. The burner apparatus 10 may then be safely refueled.

As an additional safety feature, the combustion air damper 48 and the flue gas damper 34 are spring loaded 349 and 347, respectively, so that both dampers will close in the event of a loss of power or a system alarm state. Safety interlocks 353 and 355, preferably electromagnets, are used. If the computer controller 340 detects an open fuel door 178 while either the combustion air damper 48 or the flue gas damper 34 is open, then a system malfunction is indicated. The computer controller 340 then immediately switches off the safety interlock magnets 353 and 355 via signals 357 and 359, respectively. The spring-loaded dampers 48 and 34 then slam shut in less than one second. During a power failure the dampers are automatically shut as the interlock magnets are de-energized. In addition, the computer controller 340 will switch off the safety interlocks 353 and 355 if excessive chamber wall temperatures trigger a thermal fuse.

The temperature of the heated gas stream 120 is monitored in the area above the turbulation device 38 using temperature sensors 146 and 328. Preferably, a sensor is placed above each turbulation device section. Each turbulation device section is, in turn, placed above each flue opening as described in FIG. 2. Referring again to FIG. 6, the computer controller 340 reads the signals 148 and 332 from the temperature sensors 146 and 328 above the turbulation device 38. The computer controller 340 calculates an averages heated gas stream temperature. The computer controller 340 uses the average heated gas stream temperature to adjust the combustion air damper 48 by feedback control.

Temperatures on the combustion chamber sidewalls 14 are monitored at several points by the computer controller 340. The computer controller 340 records and calculates a temperature gradient based on the sidewall temperature sensors 130 and 134. If an excessive temperature gradient is detected across the combustion chamber sidewalls 14, the computer controller 340 will adjust the combustion air damper 48. The combustion chamber wall temperature sensors 130 and 134 are also used to monitor temperature rise rates—particularly during system start-up. The computer controller 340 regulates the temperature of the heated gas stream 120 and protects the burner apparatus 10 from excessive thermally-induced stress, by controlling the position of the combustion air damper 48 and, therefore, the volume of combustion air 90 available to the combustion chamber.

Figure 7:
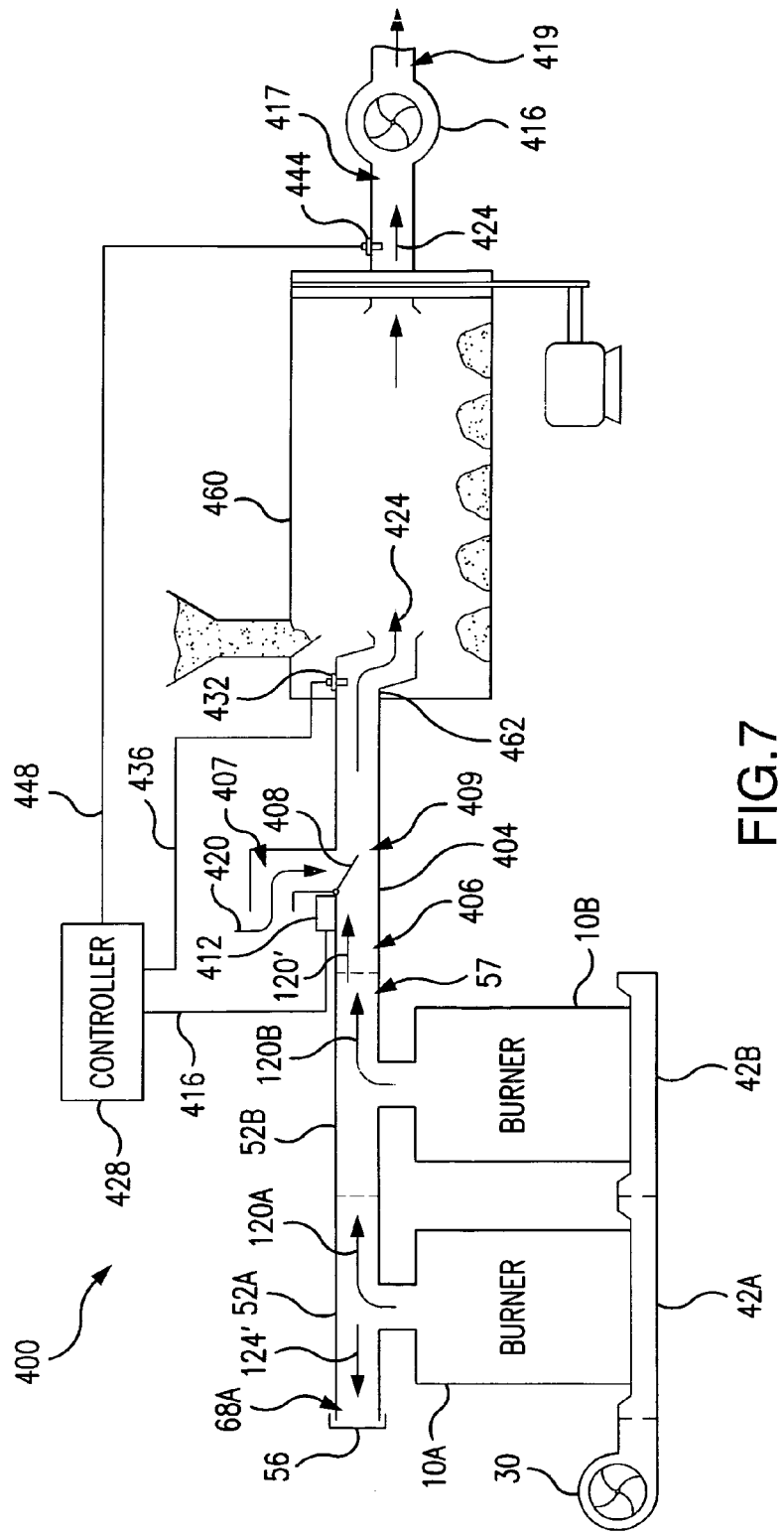
FIG. 7 is schematic of an exemplary process heating system in accordance with an embodiment of the invention.

The heating apparatus 10 described above is useful as a heating source for a process heating system. As a whole, the heating apparatus is best applied as a passive heat source. Referring now to FIG. 7, an exemplary process heating system 400 in accordance with an embodiment of the invention is illustrated in schematic form. The process heating system includes one or more burner apparatus 10A and 10B, an ambient air mixing valve 408, an induction fan 416, and a heat consuming process 460. If a single burner apparatus is used, then its construction is as shown in FIGS. 1-6 and described above. If more than one burner apparatus is used then the burners 10A and 10B are daisy chained together as shown. In particular, a single blower 30 is connected to the inlet of the air supply manifold 42A for the first burner apparatus 10A. The inlet for the second burner apparatus air supply manifold 42B is then coupled to the end of the first burner apparatus air supply manifold 42A such that the single blower 30 provides air for both units 10A and 10B. Likewise, the gas collection manifolds 52A and 52B are connected together such that the active outlet of the first burner apparatus gas collection manifold 52A is connected to the passive outlet of the second burner apparatus gas collection manifold 52B. The passive outlet 68A of the first burner apparatus gas collection manifold 52A serves as the passive outlet for both units 10A and 10B. The active outlet 57 of the second burner apparatus gas collection manifold 52B is the active outlet for both units 10A and 10B.

The ambient air mixing valve 408 includes a first inlet 406, a second inlet 407, and an outlet 409. The first inlet 406 is coupled to the active outlet 57 of the gas collection manifold 52B of the second burner apparatus 10B. The second inlet 407 is coupled to an ambient air source 420. The ambient air mixing valve 408 is preferably a movable door that, by its position, adjusts the ratio of the volume of the heated gas stream 120' to the volume of ambient air 420 and outputs the result at the outlet 409 as a process heat stream 424. The heated gas stream 120' from the gas collection manifold 52B of the second burner apparatus 10B is actually the summation of the heated gas stream 120A from the first burner apparatus 10A and the heated gas stream 120B from the second burner apparatus 10B. The heated gas stream 120' is drawn through the ambient air mixing valve 408 by negative air pressure created by the induction fan 416. Likewise, ambient air 420 is drawn through the ambient air valve 408 by this negative pressure.

An ambient air mixing valve electromechanical actuator 412, such as a motor, is mechanically attached to the ambient air mixing valve 408. The ambient air mixing valve electromechanical actuator 412 mechanically moves the ambient air mixing valve 408 by, for example, rotating the valve door 408 about a hinged end. Rotation of the valve door 408 effectively changes the temperature of the air exiting the ambient air mixing valve outlet 409. The valve door 408 may be completely opened such that only the heated gas stream 120' is allowed to pass through to the induction fan 416. At the other end of the spectrum, the valve door 408 may be completely closed such that only the ambient air 420 is allowed to pass through as the process heat stream 424. A computer controller 428 controls the position of the ambient air mixing valve 408 by commanding the ambient air mixing valve electromechanical actuator 412 via a command signal 416. The induction fan 416 includes an inlet 417 and an outlet 419. The induction fan draws the process heat stream 424 through the heat-consuming process 460. Any heat-consuming process 460 may be used. In the preferred embodiment, an industrial drying system is used. More preferably, the process 460 is a rotary drum system for drying biomass such as wood or wood pellets. The heat-consuming process has an inlet duct 462 that receives the process heat stream 424.

The process heating system 400 further includes a means to control the temperature of the process heat stream 424 used in the drying process 460. A first temperature sensor 432 is positioned to sense the temperature of the process heat stream 424 entering the heat-consuming process 460. A second temperature sensor 444 is positioned to sense the temperature of the process heat stream 424 exiting the heat-consuming process 460. The computer controller 428 reads the electrical signals 436 and 448 from the first and second temperature sensors 432 and 444, respectively. The computer controller 428 uses these readings to provide feedback control of the ambient air mixing valve 408 by commanding the control signal 416 to the ambient air mixing valve electromechanical actuator 412. For example, the computer controller 428 directs feedback control based on the second (outlet) temperature 444. Alternatively, the computer controller 428 directs feedback control based on the average of the first and second temperatures, 432 and 444, respectively. In addition, the computer controller 428 directs feedback control to prevent each temperature from deviating from a specified set point. Therefore, the computer controller 428 for the process heating system 400 monitors the input temperature and output temperature of the drying system's drum 460. These temperatures are used by the computer controller to adjust the ambient air mixing valve 408 to allow more or less ambient (cool) air into the drying system 460 while simultaneously blocking more or less of the heated gas stream 120' from the several burner apparatus 10A and 10B.

The industrial drying system 460 draws the process heat stream via negative pressure. The burner apparatus 10A and 10B produce heated gas streams 120A and 120B at atmospheric pressure. These burner apparatus 10A and 10B are not designed to fluctuate rapidly in thermal output during normal operation. Rather, each burner 10A and 10B is designed to use its large thermal mass and its local computer controller to help even out fluctuations that occur naturally in combustion of a large contiguous fuel mass and to generate heated gas streams 120A and 120B of relatively constant temperatures. However, the industrial drying system 460 will often require rapid changes in thermal input rate due to sometimes unpredictable feedstock flow rates or moisture content. The ambient air mixing valve 408, combined with a computer controller 428 and feedback from the two temperature sensors 432 and 444 allows process heating system 400 to accomplish a rapid temperature response at the drying process 460 while using the steady-state burner apparatus 10A and 10B as the heat source.

Under ideal conditions, the total heated gas stream 120' from the several burner apparatus 10A and 10B perfectly matches the thermal input needs of the drying system 460. In such a case, there is no need to add ambient air 420 via the ambient air mixing valve 408. However, it is more likely that some of the heated gas stream 120' from the several burner apparatus 10A and 10B will be in excess of what is needed and therefore must be vented to the environment. In such a case, the overall process heating system 400 has excess capacity to allow for sudden small increases in demand from the drying system 460. When the ambient air mixing valve 408 restricts input of the heated gas stream 120', the excess heated gas stream 124' is returned toward the passive outlet 68A of the first burner apparatus 10A. This excess heated gas stream 124' is vented from the passive outlet 68A through the expandable metal cap 56. An experienced operator will be able to adjust the drying process 460 and the process heating system 400 so that a minimal amount of heated gas stream 120' is wasted from the passive end 68A. Under such circumstances, the ambient air mixing valve 404 will fluctuate between about 0% and 10% ambient air most of the time.

The process heating system 400, as configured and when properly applied, will match the thermal requirements of the drying system 460 such it will be necessary to vent only a small amount of rejected heated gas stream 124' from the passive outlet 68A during normal operation. If the combination of the several burner apparatus 10A and 10B is insufficient to meet the volumetric requirements drying process 460, then the induction fan 416 may attempt to draw so much heated gas stream 120' from the gas collection manifold 52B that significant amounts of ambient air are actually drawn through the passive outlet 68A of the gas collection manifold 52A—even when the ambient air mixing valve 408 is fully closed so that no ambient air is required. Such a system lacks sufficient heat capacity.

The ambient air mixing valve 408 provides an important safety feature. If the drying process 460 experiences a feed failure, then the temperature in the drying drum will rapidly escalate due the reduction in thermal demand. In the worst case, a fire could occur in the drying drum 460. However, continuous monitoring of the input and output temperature sensors 432 and 440 allows the computer controller 428 to detect a potentially dangerous temperature rise. The computer controller 428 commands the ambient air mixing valve 408 to a full open position where only ambient air 420 is fed to the drying process 460 while the heated gas stream 120' safely vented into the atmosphere—thereby protecting the drying process 460 and other downstream equipment.

This invention is intended to fill the need for an economical process heating system for biomass processing operations producing less than 10 tons/hour. This new process heating system is deceivingly simple in concept and operation. Thermodynamic and fluid dynamic modeling along with reaction stoichiometric analysis were required to determine the necessary volume and speed of the cooling air flow needed to keep the combustion chamber walls cool while not over-diluting the combustion gas stream exiting the combustion chamber. Finding an optimum point between cooling effect due to flow velocity and energetic expense in the form of required fan power also required mathematical modeling of the invention's combustion and cooling system. Determining the maximum size and particular dimensions of the combustion chamber that would allow for successful cooling of the combustion chamber within required limits of power consumption was also part of the thermodynamic modeling performed in the design of the invention.

The above detailed description of the invention, and the examples described therein, has been presented for the purposes of illustration and description. While the principles of the invention have been described above in connection with a specific device, it is to be clearly understood that this description is made only by way of example and not as a limitation on the scope of the invention.

What is claimed is:

1. A burner apparatus for generating a heated gas stream for a process heating system, the apparatus comprising:
   a combustion air damper having an inlet and a plurality of outlets, wherein the inlet is coupled to an air supply and wherein the combustion air damper is operable to adjustably control the volume of air exiting the plurality of outlets;
   a combustion chamber having a top, a bottom, a plurality of sidewalls, a fuel grate, a flue, and a fuel door, wherein the fuel grate is suspended above the plurality of combustion air damper outlets, wherein the top, bottom, and plurality of sidewalls are steel without refractory material lining, and wherein the fuel door is steel with refractory material lining;
   a flue gas damper having an inlet and an outlet, wherein the flue gas damper is operable to selectively allow or disallow flue gas to exit through the combustion chamber flue;
   a cooling jacket having an inlet and an outlet, wherein the cooling jacket is a steel sheeting surrounding and narrowly spaced from the combustion chamber top, bottom, and plurality of sidewalls, wherein the inlet is coupled to an air supply, wherein the cooling jacket is operable to conduct air from inlet to outlet and to transfer heat from the combustion chamber top, bottom, and plurality of sidewalls and into the air to thereby prevent the combustion chamber top, bottom, and plurality of sidewalls from overheating and to generate heated air at the outlet; and
   a turbulation device having an inlet and an outlet, wherein the inlet is coupled to the flue gas damper outlet and to the cooling jacket outlet, wherein the turbulation device is operable to combine flue gas and heated air into a turbulent air-gas mixture, to complete combustion of the turbulent air-gas mixture, and to output a heated gas stream though the outlet;
   a blower; and
   an air supply manifold having an inlet and a plurality of outlets, wherein the inlet is coupled to the blower, wherein at least one outlet is coupled to the combustion air damper inlet and at least one outlet is coupled to the cooling jacket inlet, and wherein the air supply manifold is operable to supply air to at least one additional burner apparatus.

2. The apparatus of claim 1, further comprising:
   a gas collection manifold having an inlet, a passive outlet, and an active outlet wherein the inlet is coupled to the turbulation device outlet, wherein the active outlet is operable to conduct, under negative pressure, the heated gas stream, wherein the passive outlet is operable to allow the heated gas stream to vent to the atmosphere when the active outlet does not have negative pressure, and wherein the gas collection manifold is operable to collect the heated gas stream from at least one additional burner apparatus.

3. The apparatus of claim 1, wherein the turbulation device further comprises:
   a first plate having a bottom side, a top side, and circular opening;
   a plurality of slats, each having top ends and bottom ends, wherein each slat top end is attached to the bottom side of the first plate along the perimeter of the first plate circular opening; and
   a second plate having a bottom side, a top side, and a circular shape, wherein each slat bottom end is attached to the top side of the second plate along the perimeter of the second plate circular shape, wherein the first plate circular opening forms the turbulation device outlet, wherein the spaces between the slats form the turbulation device inlet, and wherein the plurality of slats are arranged at an angle offset from the radius of the first plate circular opening and second plate circular shape such that the combined flue gas and heated air exiting between the slats is caused to swirl in a turbulent air-gas mixture.

4. The apparatus of claim 1, further comprising:
   a first temperature sensor positioned to sense the temperature at a first location one of the plurality of combustion chamber sidewalls;
   a second temperature sensor positioned to sense the temperature at a first location of the heated gas stream;
   a first electromechanical actuator mechanically coupled to the combustion air damper and operable to adjust the position of the combustion air damper in response to a first electrical signal;
   a second electromechanical actuator mechanically coupled to the flue gas damper and operable to open and shut the flue gas damper in response to a second electrical signal; and a computer controller electrically coupled to the first and second temperature sensors and the first and second electromechanical actuators and operable to read the first and second temperature sensors and to control the first and second electrical signals based thereupon.

5. The apparatus of claim 4, further comprising:
a third electromechanical actuator mechanically coupled to the combustion chamber fuel door and operable lock or unlock the combustion chamber fuel door in response to a third electrical signal, wherein the computer controller is electrically coupled to the third electromechanical actuator and is further operable to control the third electrical signal.

6. The apparatus of claim 4, further comprising:
a first electromagnet mechanically coupled to the combustion air damper and de-energized during an alarm state or a loss of electrical power;
a first spring mechanically coupled to the combustion air damper and operable to close the combustion air damper when the first electromagnet is de-energized,
a second electromagnet mechanically coupled to the flue as damper and de-energized during an alarm state or a loss of electrical power; and
a second spring mechanically coupled to the flue gas damper and operable to close the damper when the second electromagnet is de-energized.

7. The apparatus of claim 4, further comprising:
a third temperature sensor positioned to sense the temperature at a second location on one of the plurality of combustion chamber sidewalls, wherein the computer controller is further operable to calculate a temperature gradient between the first and second combustion chamber sidewall locations and to control the first and second electrical signals thereupon.

8. The apparatus of claim 4, further comprising:
a third temperature sensor positioned to sense the temperature at a second location of the heated gas stream, wherein the computer controller is further operable to calculate an average heated gas stream temperature based on the first and second heated gas stream locations and to control the first and second electrical signals thereupon.

9. A process heating system, system comprising:
a burner apparatus for generating a heated gas stream for a process heating system, the apparatus comprising:
a blower;
an air supply manifold having an inlet and a plurality of outlets, wherein the inlet is coupled to the blower and wherein the air supply manifold is operable to supply air to at least one additional burner apparatus;
a combustion air damper having an inlet and a plurality of outlets, wherein the inlet is coupled to at least one air supply manifold outlet and wherein the combustion air damper is operable to adjustably control the volume of air exiting the plurality of outlets;
a combustion chamber having a top, a bottom, a plurality of sidewalls, a fuel grate, a flue, and a fuel door, wherein the fuel grate is suspended above the plurality of combustion air damper outlets, wherein the top, bottom, and plurality of sidewalls are steel without refractory material lining, and wherein the fuel door is steel with refractory material lining;
a flue gas damper having an inlet and an outlet, wherein the flue gas damper is operable to selectively allow or disallow flue gas to exit through the combustion chamber flue;
a cooling jacket having an inlet and an outlet, wherein the cooling jacket is a steel sheeting surrounding and narrowly spaced from the combustion chamber top, bottom, and plurality of sidewalls, wherein the inlet is coupled to at least one air supply manifold outlet, wherein the cooling jacket is operable to conduct air from inlet to outlet and to transfer heat from the combustion chamber top, bottom, and plurality of sidewalls and into the air to thereby prevent the combustion chamber top, bottom, and plurality of sidewalls from overheating and to generate heated air at the outlet;
a turbulation device having an inlet and an outlet, wherein the inlet is coupled to the flue gas damper outlet and to the cooling jacket outlet, wherein the turbulation device is operable to combine flue gas and heated air into a turbulent air-gas mixture, to complete combustion of the turbulent air-gas mixture, and to output a heated gas stream though the outlet; and
a gas collection manifold having an inlet, a passive outlet, and an active outlet wherein the inlet is coupled to the turbulation device outlet, wherein the active outlet is operable to conduct, under negative pressure, the heated gas stream, wherein the passive outlet is operable to allow the heated gas stream to vent to the atmosphere when the active outlet does not have negative pressure, and wherein the gas collection manifold is operable to collect the heated gas stream from at least one additional burner apparatus; and
an ambient air mixing valve having a first inlet, a second inlet, and an outlet, wherein the first inlet is coupled to the active outlet of the gas collection manifold and the second inlet is coupled to an ambient air source and wherein the ambient air mixing valve is operable to adjust the ratio of the volume of the heated gas stream to the volume of ambient air output at the outlet as a process heat stream;
a heat-consuming process having an and an outlet duct, wherein the inlet duct is coupled to the ambient air mixing valve outlet and is operable to receive the process heat stream; and
an induction fan having an inlet, wherein the inlet is coupled to the heat-consuming process outlet and wherein the induction fan is capable of drawing the process heat stream through the heat-consuming process.

10. The process heating system of claim 9, further comprising:
a first temperature sensor positioned to sense the temperature as the process heat stream enters the heat-consuming process;
a second temperature sensor positioned to sense the temperature as the process heat stream exits the heat-consuming process;
an electromechanical actuator mechanically coupled to the ambient air mixing valve and operable to adjust the position of the ambient air mixing valve in response to an electrical signal; and
a computer controller electrically coupled to the first and second temperature sensors and the electromechanical actuator and operable to read the first and second temperature sensors and to control the electrical signal based thereupon.

11. The apparatus of claim 9, further comprising:
a first temperature sensor positioned to sense the temperature at a first location on one of the plurality of combustion chamber sidewalls;

a second temperature sensor positioned to sense the temperature at a first location of the heated gas stream;

a first electromechanical actuator mechanically coupled to the combustion air damper and operable to adjust the position of the combustion air damper in response to a first electrical signal;

a second electromechanical actuator mechanically coupled to the flue gas damper and operable to open and shut the flue gas damper in response to a second electrical signal;

a third electromechanical actuator mechanically coupled to the combustion chamber fuel door and operable to lock or unlock the combustion chamber fuel door in response to a third electrical signal; and a computer controller electrically coupled to the first and second temperature sensors and the first, second, and third electromechanical actuators and operable to read the first and second temperature sensors and to control the first, second, and third electrical signals based thereupon.

12. The apparatus of claim 11, further comprising:

a first electromagnet mechanically coupled to the combustion air damper and de-energized during an alarm state or a loss of electrical power;

a first spring mechanically coupled to the combustion air damper and operable to close the combustion air damper when the first electromagnet is de-energized;

a second electromagnet mechanically coupled to the flue gas damper and de-energized during an alarm state or a loss of electrical power; and a second spring mechanically coupled to the flue gas damper and operable to close the damper when the second electromagnet is de-energized.

13. The apparatus of claim 11, further comprising:

a third temperature sensor positioned to sense the temperature at a second location on one of the plurality of combustion chamber sidewalls, wherein the computer controller is further operable to calculate a temperature gradient between the first and second combustion chamber sidewall locations and to control the first and second electrical signals thereupon.

14. The apparatus of claim 11, further comprising:

a third temperature sensor positioned to sense the temperature at a second location of the heated gas stream, wherein the computer controller is further operable to calculate an average heated gas stream temperature based on the first and second heated gas stream locations and to control the first and second electrical signals thereupon.

* * * * *